US010996820B2

(12) United States Patent
Spahlholz et al.

(10) Patent No.: US 10,996,820 B2
(45) Date of Patent: May 4, 2021

(54) METHOD FOR DISPLAYING AN OPERATING MENU AND ACTIVATING A COOKING APPLIANCE

(71) Applicant: FRIMA International AG, Heerbrugg (CH)

(72) Inventors: Kevin Spahlholz, Heerbrugg (CH); Simon Endres, Heerbrugg (CH); Michael Hoenig, Freiburg im Breisgau (DE); Simone Wallstein, Heerbrugg (CH)

(73) Assignee: FRIMA INTERNATIONAL AG, Heerbrugg (CH)

( * ) Notice: Subject to any disclaimer, the term of this patent is extended or adjusted under 35 U.S.C. 154(b) by 39 days.

(21) Appl. No.: 16/229,206

(22) Filed: Dec. 21, 2018

(65) Prior Publication Data

US 2019/0204995 A1  Jul. 4, 2019

(30) Foreign Application Priority Data

Dec. 29, 2017 (IT) .......................... 102017000151066
Dec. 29, 2017 (IT) .......................... 102017000151095
(Continued)

(51) Int. Cl.
*G06F 3/048* (2013.01)
*G06F 3/0482* (2013.01)
(Continued)

(52) U.S. Cl.
CPC ............ *G06F 3/0482* (2013.01); *F24C 7/086* (2013.01); *G06F 3/0484* (2013.01); *G06F 3/04847* (2013.01); *G06F 3/04886* (2013.01)

(58) Field of Classification Search
CPC .. G06F 3/0482; G06F 3/04886; G06F 3/0484; G06F 3/04847; F24C 7/086
(Continued)

(56) References Cited

U.S. PATENT DOCUMENTS 5,111,028 A    5/1992  Lee
6,097,016 A    8/2000  Hirata et al.
(Continued)

FOREIGN PATENT DOCUMENTS

DE  202006009284 U1  10/2007
DE  102008021246 A1  11/2009
(Continued)

*Primary Examiner* — Renee D Chavez
*Assistant Examiner* — Jianmei F Duckworth
(74) *Attorney, Agent, or Firm* — Dilworth IP, LLC

(57) ABSTRACT

In a method of displaying at least one operating menu of a cooking appliance on a touchscreen and of controlling the cooking appliance, provision is made that in the first menu level, a first overview field of at least one cooking chamber defined by a flat heating surface, on which food to be cooked can be placed or poured, and having directly selectable areas of the cooking chamber in the first menu level for separate activation, and, additionally, a second overview field having different predefined cooking chamber subdivisions and/or a third overview field having a plurality of different cooking applications and/or a fourth overview field having different, predefined cooking chamber subdivisions with already allocated cooking applications are displayed at the same time.

20 Claims, 7 Drawing Sheets

(30) Foreign Application Priority Data

Dec. 29, 2017 (IT) .......................... 102017000151112
Dec. 29, 2017 (IT) .......................... 102017000151117

(51) Int. Cl.
  *G06F 3/0488* (2013.01)
  *G06F 3/0484* (2013.01)
  *F24C 7/08* (2006.01)

(58) Field of Classification Search
  USPC .......................................................... 715/841
  See application file for complete search history.

(56) References Cited

U.S. PATENT DOCUMENTS

| | | |
|---|---|---|
| 2003/0047553 A1 | 3/2003 | Patti et al. |
| 2004/0200828 A1 | 10/2004 | Becker et al. |
| 2005/0273723 A1* | 12/2005 | Sharpe .................. A61F 5/03 |
| | | 715/764 |
| 2010/0196561 A1 | 8/2010 | Kling et al. |
| 2012/0003364 A1 | 1/2012 | Kling et al. |
| 2013/0055147 A1* | 2/2013 | Vasudev .................. G06F 8/38 |
| | | 715/781 |
| 2018/0152998 A1* | 5/2018 | Rollet .................. H05B 6/6435 |
| 2019/0120498 A1* | 4/2019 | Zanchetta ................ A21B 7/00 |

FOREIGN PATENT DOCUMENTS

| | | |
|---|---|---|
| DE | 102009006224 A1 | 7/2010 |
| DE | 102011001071 A1 | 9/2012 |
| DE | 102012002308 A1 | 8/2013 |
| DE | 102013110644 B3 | 3/2015 |
| DE | 102013017201 A1 | 4/2015 |
| DE | 102013017202 A1 | 4/2015 |
| DE | 202015105748 U1 | 11/2015 |
| EP | 2211116 A1 | 5/1987 |
| EP | 0948240 A2 | 10/1999 |
| EP | 2085700 A2 | 8/2009 |
| EP | 2113721 A1 | 11/2009 |
| EP | 2189724 A1 | 5/2010 |
| EP | 2211115 A2 | 7/2010 |
| EP | 2211117 A1 | 7/2010 |
| EP | 2268101 A1 | 12/2010 |
| EP | 2767761 A2 | 8/2014 |
| GB | 2264370 A | 8/1993 |
| JP | H05231650 A | 9/1993 |

* cited by examiner

METHOD FOR DISPLAYING AN OPERATING MENU AND ACTIVATING A COOKING APPLIANCE

The invention relates to a method of displaying at least one operating menu of a cooking appliance on a touchscreen and of controlling the cooking appliance, the operating menu having different menu levels.

BACKGROUND OF THE INVENTION

In canteen kitchens, cooking appliances are employed which, in a cooking chamber, have a large number of areas in which foods to be cooked that vary from area to area can be cooked. The applicant sells a cooking appliance under the trade name of Variocooking Center® in the form of a tilting pan which has a large number of cooking zones for heating in a pan using contact heat.

The current cooking appliances are highly flexible as regards their application, in particular by virtue of the subdivision of the cooking chambers into individual areas. To exploit the options, an operator should indeed have a certain affinity for electronic operating concepts.

It is the object of the invention to make the operation of a cooking appliance having one or more cooking chambers formed by one or more flat heating surfaces, on which food to be cooked is placed or poured, even more intuitive and, above all, even faster, so that the teach-in phases for the operator can also be significantly shortened.

SUMMARY OF THE INVENTION

According to a first aspect, the invention provides a method of displaying at least one operating menu of a cooking appliance on a touchscreen and of controlling the cooking appliance, the operating menu having different menu levels, wherein in the first menu level, the following are displayed at the same time:
  a) a first overview field of at least one symbolically displayed cooking chamber forming a flat heating surface and having directly selectable areas of the cooking chamber in the first menu level for separate activation, and, additionally, at least one of the following overview fields,
  b) a second overview field having a plurality of different predefined cooking chamber subdivisions, which include different, separately activatable, symbolically reproduced areas of the cooking chamber, the predefined cooking chamber subdivisions being directly selectable on the touchscreen in the first menu level for activation;
  c) a third overview field having a plurality of different symbolically represented cooking applications, which are selectable directly on the touchscreen in the first level for activation; and
  d) a fourth overview field having different, predefined cooking chamber subdivisions with already allocated cooking applications, which are directly selectable in the first menu level.

The method according to the invention provides that in addition to the first overview field, at least one further overview field (second to fourth overview fields) is additionally displayed in the first menu level. The overview fields symbolize the flat heating surface in the cooking chamber, which serves to heat the cooking chamber. Usually the heating surface is the bottom of the cooking chamber. The operator therefore does not need to penetrate submenu levels, which he/she may not know by heart in case of doubt, but can enter in the first menu level the operating commands most important to him/her. The first overview field symbolically represents at least one cooking chamber that is defined by a flat heating surface on which food to be cooked is placed or poured. In this cooking chamber, areas can be functionally separated and directly selected in that, for example, the cooking chamber has a grid or raster on the touchscreen and the individual fields (areas) of the flat heating surface can be touched or tapped directly in order to activate or select them. This means that the grid or raster and the individual areas form virtual keys on the touchscreen, by the actuation of which areas can be selected or activated instantly (e.g. heated). Here, the operator can very quickly select larger or smaller areas, for example, and interconnect them if required. The selection may then optionally be extended to other areas by touching or by a wiping movement. Alternatively, however, the operator can select already predefined cooking chamber subdivisions in the first menu level by touching a key, for example, select the entire cooking chamber or divide the cooking chamber into two halves or three sections of equal size or into the smallest possible areas. For these different options of the cooking chamber subdivisions, virtual keys are usually available in the second overview field, which are reproduced on the touchscreen and are switched by touch.

The third overview field contains various cooking applications, that is, braising, frying fish, cooking, etc. These different cooking applications also have their own virtual keys, which are arranged individually in the third overview field according to the needs of the user, for example next to each other or one below the other, and can thus be detected and operated quickly and clearly.

The fourth overview field comprises different predefined cooking chamber subdivisions with already allocated cooking applications. These different cooking chamber subdivisions with allocated cooking applications can then be selected directly in the first menu level when the fourth overview field is displayed. This can be realized as follows, for example. A virtual key shows a maximum subdivision of the cooking chamber into six areas, and in these six areas, the "roast steak" cooking application is allocated to each area. A further virtual key in the fourth overview field provides that "roast steak" is allocated to four areas and the "slow braising" cooking application is allocated to two areas. This is useful if, for example, braised meat is ordered less often than steaks, so that heating of the remaining areas is unnecessary. With the aid of the fourth overview field, the operator can process his/her usual vouchers very quickly by selecting the cooking chamber subdivision along with the already allocated cooking application at the touch of a key.

Optionally, the third overview field can be displayed in the first menu level in any event. Without leaving the first menu level, the operator can select areas of the cooking chamber, either via the first or the second overview field and then allocate cooking applications to the selected area. This provides an operating possibility of maximum rapidity. For example, the operator can immediately select an area of the cooking chamber by a "key press" on the touchscreen to roast a steak, and allocate the "roast steak" cooking application by the second key press. Of course, this can also be done vice versa, i.e. by first selecting the cooking application and subsequently the area. This can be effected, for example, by a drag and drop function, by first selecting the cooking application and then dragging it to the desired area or areas. But it is also possible to set different areas with different cooking applications very quickly over the entire cooking chamber, for example fry fish at the front edge of the cooking chamber and braise meat at the rear edge of the cooking chamber, etc.

But it is also possible that in the first menu level, only the second, the third or only the fourth overview field is displayed. Additional virtual keys, which are permanently available, can then be used to select, by pressing a key, whether the second, the third or the fourth overview field is displayed in the first menu level, i.e. whether it is the overview field displayed in addition to the first overview field.

After selecting an option in the second, third and/or fourth overview field, the remaining options of these overview fields can be faded out in order to prevent an inadvertent operation of keys. These options are implemented by virtual keys on the touchscreen and can be selected. If, for example, the operator has selected from the second overview field the virtual key with the activation of the entire cooking chamber, the remaining keys are no longer displayed so that the operator does not accidentally touch these keys, thereby switching the cooking appliance over.

The operating menu becomes even clearer if the use of the operating menu is saved in a controller and, in a subsequent operation, at least the most rarely used overview field from the group of the second, third and fourth overview fields is faded out from the first menu level. This means that in this case the display is self-learning and relieves the operator of too much information that he/she does not use. The display in the first menu level is thus protected against overloading of symbols and overview fields. Alternatively, it is even possible that due to the controller only the last used overview field is faded in and the remaining overview fields are faded out. For example, if the operator never works with the fourth overview field, this field may not be displayed for that operator.

The invention also provides for the method to be carried out operator-specifically. This means that the operator must identify himself/herself when logging on. Since each operator has different preferences for operation, in the first menu level the display is tailored to the operator using his/her stored user data, for example by fading out one of the overview fields. Since, as will also still be discussed below, the operator can program individual keys with allocated individual cooking chamber subdivisions, cooking applications or combined cooking chamber subdivisions with already allocated cooking chamber applications, for this operator "his" or "her" virtual keys created by him/her are only displayed to him/her.

If in the first menu level a so-called retrieval key is provided, i.e. a virtual key for retrieval of each faded-out overview field, the associated overview field can appear in the first menu level again upon selecting this retrieval key. This retrieval key may be relatively small in area so as not to overload the display.

The allocation of selected areas of the cooking chamber to applications or, conversely, of cooking applications to selected areas of the cooking chamber may be effected, for example, in that the areas are selected in the first overview field and cooking applications are selected in the third overview field, i.e. the corresponding symbol keys, in particular by touching or by a drag and drop function. The sequence of allocation is arbitrary, i.e. first an area may be selected and then a cooking application, or vice versa.

This allocation is performed in the first menu level itself, which need not be exited.

After selecting a cooking application or allocating cooking areas and cooking applications, the first overview field preferably displays to which areas or additional areas the selected cooking application may be extended.

According to a first example, a frying process takes place at extremely high temperatures in the front area of the cooking chamber, while braising is effected at low temperatures in the rear area of the cooking chamber. Now if the operator has to fry further steaks, for example, this may possibly not be done in the area immediately adjacent to the "braising" area. The controller determines which areas would still be possible and displays them, for example by lighting up these virtual areas on the touchscreen or by appropriate arrows from the area with the cooking application to be extended to the possible, previously unused areas. These further areas, to which the selected cooking application is to be extended, can be linked to the selected cooking application by the operator, for example by touching or wiping, which also permits extremely fast operation.

According to a second example, similarly to what has been discussed earlier in connection with the possibility of extending cooking applications to other areas after the allocation of cooking areas and cooking applications, as early as after a selection of a cooking application, the first overview field displays at least one area which is allocated in an optimized manner by an allocated controller. This area can then be selected in order to place the selected or new cooking application in this area or to extend it to this area. The other areas are either not displayed, not framed, or grayed out or do not appear in the respective color intensity or brightness. By way of example, the operator would like to fry another steak, with the controller determining which area still has a high residual heat from a previous cooking application. This particular area will then be displayed as a proposal for carrying out the cooking application in this area and for saving energy.

Furthermore, cooking applications can be individualized in submenus that are called from the first menu level. This means that the operator is not limited only to those cooking applications indicated in the first menu level, but may preferably even at any time, i.e. even while cooking is ongoing, either program cooking applications for new virtual keys or change running cooking applications. In a submenu, additional, individually parameterizable select keys can be generated and permanently saved for the second, third and/or fourth overview field.

An alternative function consists in that from the first menu level a submenu can be called in which the predefined cooking chamber subdivisions, predefined cooking applications and predefined cooking chamber subdivisions with already allocated cooking applications, to be displayed in the first menu level in the second to fourth overview fields, respectively, can be selected and/or positioned. In other words, the operator can, for example, select in the second overview field all of the predefined cooking chamber subdivisions to be directly displayed therein and also the sequence thereof, so that he/she can move his/her most frequently used cooking chamber subdivision to the far left, for example. The same applies to the corresponding virtual keys of the third and fourth overview fields.

These additional select keys are optionally independently included in the allocated one of the second, third or fourth overview fields by the controller after the saving and are directly displayed in the first menu level. For example, the controller may be designed to remove the respective least used select key in the respective overview field therefor from the first menu level. However, this removed select key may then still be available in a submenu and can be dragged up again into the first menu level by the operator.

There are cooking appliances having a plurality of cooking chambers, for example cooking appliances having two pans or hot-air and steam cooking appliances having cooking chambers located one above the other, which optionally are connected to form one large cooking chamber; here, however, individual levels within the meaning of the invention each define their own cooking chamber. The method according to the invention provides that in the first menu level and in the first overview field, either this plurality of cooking chambers are displayed symbolically and next to each other with directly selectable and thereby activatable areas of the respective cooking chambers or that at first the cooking chambers can be selected individually in order to then be displayed alone. In the latter case this may result in better clarity.

The operator is also to be given the option to obtain more detailed information on the selected cooking application, for example a display of the actual values for the cooking temperature, cooking progress and/or remaining cooking time. For this purpose, an information display area is available in the first menu level, or it can be faded in in the first menu level by selection. This information display area then contains information in relation to parameters for each area of the cooking chamber.

Each area in the first overview field is optionally selectable such that access to at least one of the following keys is effected, which are faded in: stop key, timer key, delete key, key for opening a function to change the selected areas, and modifier key for opening the submenu. These keys may also be available by the interposition of a pop-over key, which is faded in in the first overview field after selection. This means that the operator has a relatively small virtual key, namely the pop-over key, which, after being touched, causes the other keys or the preselected other keys to appear, so that, for example by interposition of the pop-over key, the timer key is available immediately.

According to a second aspect, the invention provides a method of displaying at least one operating menu of a cooking appliance on a touchscreen and of controlling the cooking appliance, the operating menu having different menu levels and, in a first menu level, different predefined cooking chamber subdivisions with already allocated cooking applications are displayed in an overview field and are directly selectable in the first menu level. The cooking chamber subdivisions displayed correspond to the possible cooking chamber subdivisions available in the connected cooking chamber. This means that the display reproduces optional actual cooking chamber subdivisions in the cooking chamber. The cooking applications stand for different heating temperatures and temperature profiles as well as heating times. In the area of the displays of the cooking chamber subdivisions, the touchscreen therefore forms individual keys or switches, by means of which cooking chamber sections can be selected and activated in the controller, so that these sections are eventually individualizably heated.

In particular, the invention relates to a method of displaying an operating menu and of controlling a cooking appliance having one or more cooking chambers formed by one or more flat heating surfaces on which food to be cooked is placed or poured.

The invention assumes that frequently the same cooking applications and batches or charges occur in a kitchen, e.g. in a canteen, so that for further ease of operation, not only the subdivision of the cooking chambers is predefined, but cooking applications are also already allocated to the areas. By touching a key, the operator manages to subdivide the entire cooking chamber and simultaneously assign cooking applications thereto. Due to the fact that numerous cooking chamber subdivisions are listed in the overview field and can be called up at the touch of a key, the operator continues to have a high degree of flexibility. For example, one virtual key shows a maximum subdivision of the cooking chamber into six areas, and in these six areas, the "roast steak" cooking application is allocated to each area. Another virtual key provides for only two areas that are selected thereby, which are allocated to the "slow braising" cooking application. This is useful if, for example, braised meat is ordered less often than steaks, so that a heating of the remaining areas is unnecessary. With the aid of the overview field, the operator can process his/her usual vouchers very quickly by selecting the cooking chamber subdivision along with the already allocated cooking application at the touch of a key.

The overview field provided according to the invention and having different predefined cooking chamber subdivisions with already allocated cooking applications has previously also been referred to as "fourth overview field" for easier distinguishability.

Operators of professional cooking appliances become more and more computer-savvy, which means that they have ever fewer problems using touchscreens and consider their operation to be simple and intuitive. At the same time, however, the operators are under a great time pressure. Although the operators can individualize the parameters of cooking applications and can create their own cooking sequences, these activities, for one thing, are annoying in the bustle of operation, and, for another thing, operating errors may also occur when working hectically, i.e. cooking parameters may be accidentally set incorrectly.

It is a further object of the invention to provide a method of generating an operating menu of a cooking appliance displayed on a touchscreen, which gives the operator more comfort and greater safety against operating errors.

According to a third aspect of the invention, a method of generating an operating menu of a cooking appliance displayed on a touchscreen is provided, the operating menu being used for controlling the cooking appliance and the operating menu having different menu levels, and a factory-generated overview field having a plurality of different predefined cooking chamber subdivisions being displayed in one menu level. The cooking chamber subdivisions displayed correspond to different, separately activatable areas of the real cooking chamber to be controlled and thus symbolize cooking chamber subdivisions of the cooking chamber that are possible in reality. These predefined cooking chamber subdivisions on the touchscreen are directly selectable in the menu level for activation, and the cooking appliance and its actual cooking chamber sections are activated or deactivated accordingly. The overview fields symbolize the flat heating surface in the cooking chamber, which serves to heat the cooking chamber. Usually the heating surface is the bottom of the cooking chamber. In addition to the factory-provided cooking chamber subdivisions, individual cooking chamber subdivisions for the cooking chamber to be controlled can be generated using the touchscreen and saved permanently beyond the ON time of the cooking appliance.

As a result, using the method according to the invention, the operator is not only able to effect individual cooking chamber subdivisions as before, but can permanently store these cooking chamber subdivisions that are individual for him/her also beyond the ON time of the cooking appliance. This was not possible until now; rather, the permanently saved or stored cooking chamber subdivisions were limited to the factory-set cooking chamber subdivisions. This makes it possible now for the operator to completely individualize the appliance and its operation. This may even go so far that all of the factory-set cooking chamber subdivisions are no longer faded in in the corresponding menu level, but exclusively individually created cooking chamber subdivisions. The ON time of the cooking appliance also refers to a total removal of the cooking appliance from the electric power grid. Even if the cooking appliance is removed from the power grid, the individual cooking chamber subdivisions created by the user will remain stored.

The invention relates in particular to a method of generating an operating menu of a cooking appliance displayed on a touchscreen and a cooking appliance with one or more cooking chambers formed by one or more flat heating surfaces on which food to be cooked is placed or poured.

Along with the generation of an individual cooking chamber subdivision, an individual select key may even be produced independently in the overview field by means of a controller. This means that, rather than being concealed in a submenu, the select key just created is immediately inserted into the overview field. This also speeds up operation.

The user-friendliness can be even further enhanced in that, using the touchscreen, cooking applications can be individually allocated to the individual cooking chamber subdivisions and can be stored permanently beyond the ON time of the cooking appliance. This means, for example, that the operator can assign the "roast steak" cooking application to half of his/her cooking chamber, and an appropriate select key is generated that already provides the "roast steak" cooking application for the selected areas. The cooking applications may also be provided with individualized parameters or may have factory-set parameters of cooking applications. Of course, this programming is not limited to only one cooking application per cooking chamber, but, rather, the cooking chamber may also be completely occupied, and areas may have different cooking applications allocated thereto.

The allocation of individual cooking chamber subdivisions and cooking chamber applications is effected, for example, by touching or by a drag and drop function, with the sequence of the allocation of cooking chamber subdivisions and cooking chamber applications not being fixed. For example, the operator may first select one or more areas and subsequently tap a cooking application to allocate it to the areas, or vice versa.

This allocation of cooking chamber subdivisions and cooking applications is preferably effected in a first menu level, so that the user does not have to delve into submenus in order to perform this allocation.

Even if individual cooking chamber subdivisions along with their allocated cooking applications are created, the controller independently generates an individual select key in the overview field, preferably in the first menu level.

Furthermore, the controller should also be designed to output a visual indication in the case of identical cooking chamber subdivisions which, however, have different, allocated cooking applications. This is to prevent identical symbols from being generated. For example, the controller may issue a warning or prompt the user to select a different symbol for the select key or a different name. Otherwise, the controller can also assign an index automatically in order to provide a differentiation in case of identical names or identical symbols.

In addition, each select key may have a visually displayed, individualized name field associated with it, which can be labeled using the touchscreen.

The factory-preconfigured cooking chamber subdivisions may optionally also be deleted permanently using the touchscreen, i.e. they may remain deleted beyond the ON time of the appliance. This may be advantageous because overloading of various options of cooking chamber subdivisions will detract from the overview.

The method according to the invention may also be carried out while a cooking operation is in progress. If the operator has time during cooking, for example, he/she can create and permanently save other cooking chamber subdivisions or cooking applications with new parameters during this time.

In a further development of the third aspect, the invention furthermore provides a cooking appliance having a touchscreen and a controller coupled to the touchscreen, the controller and the touchscreen being designed for carrying out the method according to the invention, and the controller having factory-stored data provided therein by means of which factory-generated overview fields having a plurality of different predefined cooking chamber subdivisions are shown on the touchscreen, which include different, separately activatable areas of the cooking chamber. The controller can be operated using the touchscreen and is designed such that in addition to the factory-provided cooking chamber subdivisions, individual cooking chamber subdivisions can be generated using the touchscreen and can be stored permanently in the controller beyond the ON time of the cooking appliance.

The controller may be designed such that with the generation of an individual cooking chamber subdivision, it independently creates an individual select key in the overview field.

The object of the invention further is to make it easier for the operator to optimally utilize the capability of the cooking appliance.

A fourth aspect of the invention provides a method of cooking food in a cooking chamber of a cooking appliance, the following steps being carried out:

at least one new cooking application is selected;
depending on the new cooking application and further cooking applications, a controller determines which area of the cooking chamber is suitable for the new cooking application;
the suitable area is displayed to a user.

In addition, the user may be given one or more of the following four further pieces of information:

A) In order to increase the acceptance of the method and the cooking appliance controlled therewith for the user, it may be displayed to the user if a desired cooking application cannot currently be started.
B) It may then also be displayed to the user why a desired cooking application cannot be started. For example, it may be displayed that the maximum permissible electrical connected load is exceeded with the desired cooking applications. A further example of a situation in which a particular cooking application cannot be started could reside in that, due to upcoming cooking applications that are time-critical, specific performance capacities or cooking areas have to be "reserved", so that they are not currently available for other applications.
C) A suggestion may then be made to the user for a change in the cooking applications. This suggestion may be a modified sequence of cooking applications, splitting a cooking application into two sub-processes, using a different cooking appliance if a plurality of cooking appliances (possibly of different types) are networked with each other.

D) It is also possible to offer a user a choice between two competing cooking applications if the cooking applications currently desired by the user cannot run simultaneously. The user can then select the cooking application that is more important to him/her.

The invention is based on the fundamental idea of suggesting to a user an area for cooking that is optimal in terms of the entire production process (or at least in terms of the production process currently under way and proceeding in the foreseeable future). This goes far beyond merely indicating to the user which area in his/her cooking appliance (that is, either which insert or tray or which surface of a cooking pan) is currently free or has the temperature etc. that is suitable for cooking the food. For example, in case two areas are currently equally suitable for cooking, the cooking appliance according to the invention can be used to suggest to the user the area that is optimal in terms of cooking processes upcoming soon.

According to the invention, when the suitable area is determined, the currently ongoing cooking applications are taken into account, as are the parameters that change in the further course, such as temperature control, as well as cooking applications that have already been planned, i.e. cooking applications that have not yet started but for which it has already been fixed when they will start in the future.

According to a preferred configuration, the suitable area is displayed to a user on an input interface, in particular a touch-sensitive screen. This means that the user receives the relevant information at the point at which he/she operates the cooking appliance.

Alternatively or additionally it may be provided that the suitable area is marked in the cooking chamber for a user, in particular illuminated with light. In this way, incorrect assignments are avoided.

It may be provided that the degree of suitability of the area is displayed to the user. This is advantageous in particular when two areas are approximately equally well suited. The user can then select the area he/she prefers with regard to his/her personal way of working.

The degree of suitability may be indicated by different colors. This is particularly intuitive. For instance, a particularly suitable area may be marked in green, while a moderately suitable area may be marked in yellow and an unsuitable area may be marked in red.

According to one configuration of the invention, a user may enter a plurality of new cooking applications, and the controller then calculates the optimum occupancy of the cooking chamber, which is then also displayed. Using this method, the cooking appliance can be employed for production planning, since the user is relieved of the consideration in which order and where different foods are to be cooked.

The controller of the cooking appliance may receive a signal about a cooking chamber separation and take the cooking chamber separation into account when determining the suitable area. Such a cooking chamber separation ("pan separation device") may be used in particular for cooking pans. It rests against the bottom of the pan and against the side walls, so that zones or cooking areas are delimited within the pan which are physically separate from each other. If it is known to the controller that and where a cooking chamber separation is employed, it can, for example, use one cooking area for soup and the other for frying fried potatoes.

The suitable area may have a complex shape deviating from a simple rectangular shape, or may be composed of a plurality of individual sections, which may be arranged at right angles or even remote from each other.

When selecting suitable areas, the controller may seek to "assign" free areas as contiguously as possible, so that a user does not have to roast the same food (e.g. several steaks) in areas separate from each other, but can roast them in adjoining areas.

According to one configuration of the invention, at least one of the following parameters is taken into account when determining the suitable area:

position and number of the water inlets for filling in water as the cooking medium;
position of the pouring spout for tipping out the cooked food;
position and number of the core temperature sensors for measuring the temperature of the food being cooked;
necessity, availability, shape, and current or possible position of a cooking chamber separation for cooking applications with a liquid cooking medium or liquid food to be cooked;
position of the cooking chamber discharge valve for draining cooking medium;
position of the filling level measuring system for detecting the filled-in amount of liquid cooking medium or liquid food being cooked;
shape and/or size of cooking baskets which are inserted in one of the pans or in a separated area of the pan, e.g. for deep-frying;
the cooking applications themselves, that is, e.g., cooking, frying, braising, deep-frying, steaming, pressure cooking, etc.;
cooking media in which the cooking applications are carried out, e.g. oil, water, steam, etc.;
position of the lid;
locking of the lid;
current temperature of the operating surface or of the cooking medium or desired temperature of the selected cooking application;
temperatures of the adjacent areas;
safety criteria;
type of food to be cooked;
ergonomics;
energy saving potential;
available power of the appliance or of the electric power grid.

After the allocation of cooking areas and cooking applications, the first overview field preferably displays to which further areas the selected cooking application can be extended. For example, in the front area of the cooking chamber, frying is carried out at extremely high temperatures, while in the rear area of the cooking chamber, braising is effected at low temperatures. Now if, for example, the operator has to fry more steaks, this may possibly not be done in the area immediately adjacent to the "braising" area. The controller determines which areas would still be possible and displays them, for example by lighting up these virtual areas on the touchscreen or by appropriate arrows from the area with the cooking application to be extended to the possible, previously unused areas. These further areas, to which the selected cooking application is to be extended, can be linked to the selected cooking application by the operator, for example by touching or wiping, which also permits extremely fast operation.

Similarly to what has been discussed above in connection with the possibility of extending cooking applications to other areas after the allocation of cooking areas and cooking applications, the invention provides that as early as after a selection of a cooking application, the first overview field displays at least one area which is allocated in an optimized manner by an allocated controller. This area can then be selected to extend the selected or new cooking application to this area. The other areas are either not displayed or grayed out or do not appear in the respective color intensity or brightness. By way of example, the operator would like to roast another steak, with the controller determining which area still has a high residual heat from a previous cooking application. This particular area will then be displayed as a proposal for carrying out the cooking application in this area and for saving energy.

It should be emphasized that the above four aspects can also be combined with each other as desired.

Cooking appliances having a plurality of individually selectable areas usually have heating elements that define these areas. In the case of pans, these are, e.g., square heating fields. These heating fields are arranged next to each other like tiles and heat the entire bottom. One option of the invention provides that areas can be selected in the first overview field which are outside the limits between neighboring heating fields, i.e. not only areas that are defined by the entire "tile shape" only can be selected, but also other areas, e.g. one and a half heating fields.

It should be emphasized that the allocation of cooking applications, cooking chamber subdivisions and areas can take place in the first menu level not only for one cooking chamber, but optionally, when there are several cooking chambers, also for these several cooking chambers. This means that the operator can occupy his/her entire cooking appliance completely and individually.

BRIEF DESCRIPTION OF THE DRAWINGS

Further features and advantages of the invention will be apparent from the following description and from the following drawings, to which reference is made and in which.

DETAILED DESCRIPTION OF THE INVENTION

Figure 1:
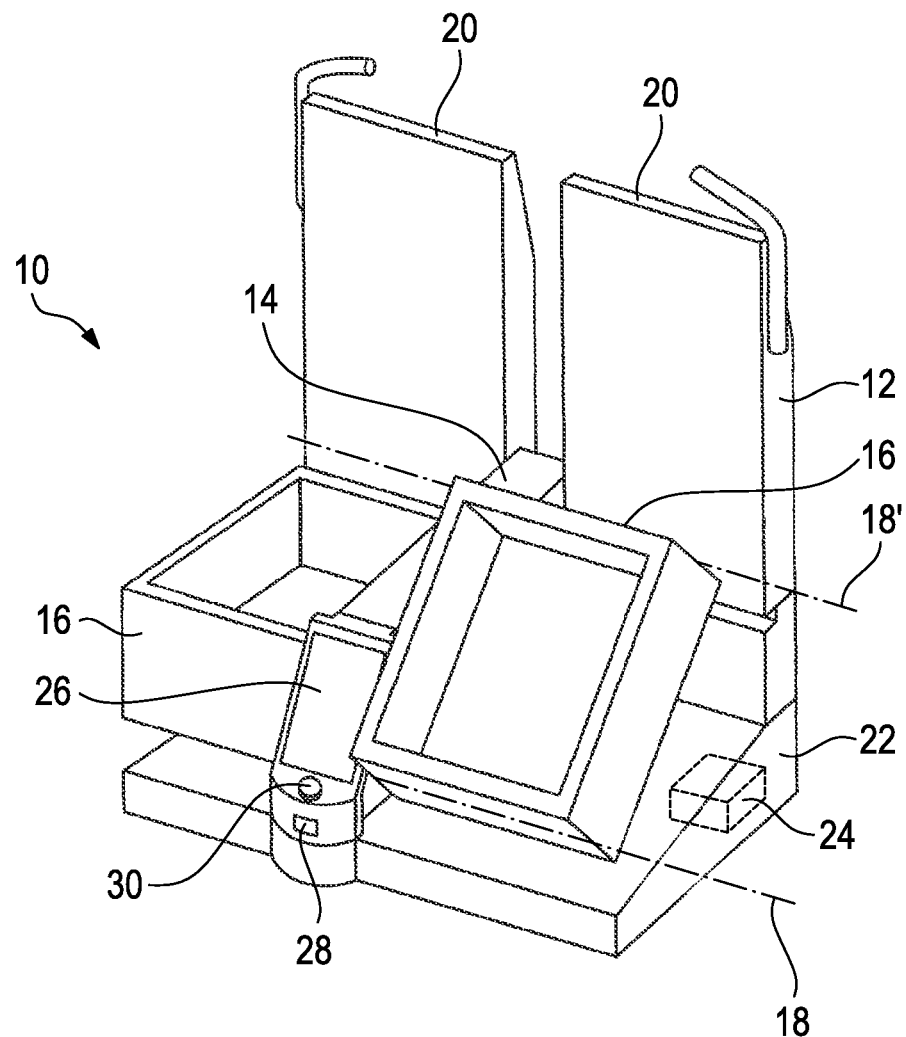
FIG. 1 shows a variant of a cooking appliance provided with a touchscreen and a controller by means of which the method according to the invention is carried out.

FIG. 1 illustrates a cooking appliance 10 designed for professional use, here, for example, in the form of a pan cooking appliance. In the embodiment illustrated in FIG. 1, the cooking appliance comprises a substantially T-shaped frame 12 having a central bar 14 supporting two pans 16 that can be actuated and utilized separately. The pans 16 can each be tilted about a swivel axis 18 by a motor.

Each pan 16 is assigned its own lid 20, which in turn can be swiveled about its own swivel axis 18'. A base 22 or a table-like substructure then holds the frame 12. A (symbolically illustrated) controller 24 may be accommodated in the base 22 or in the central bar 14 and is coupled, on the one hand, to a touchscreen 26 and, on the other hand, to all motors and heating elements in the pan 16. The touchscreen 26, possibly also additional buttons 28 or rotary controls 30 render the cooking appliance 10 controllable from outside.

Figure 2:
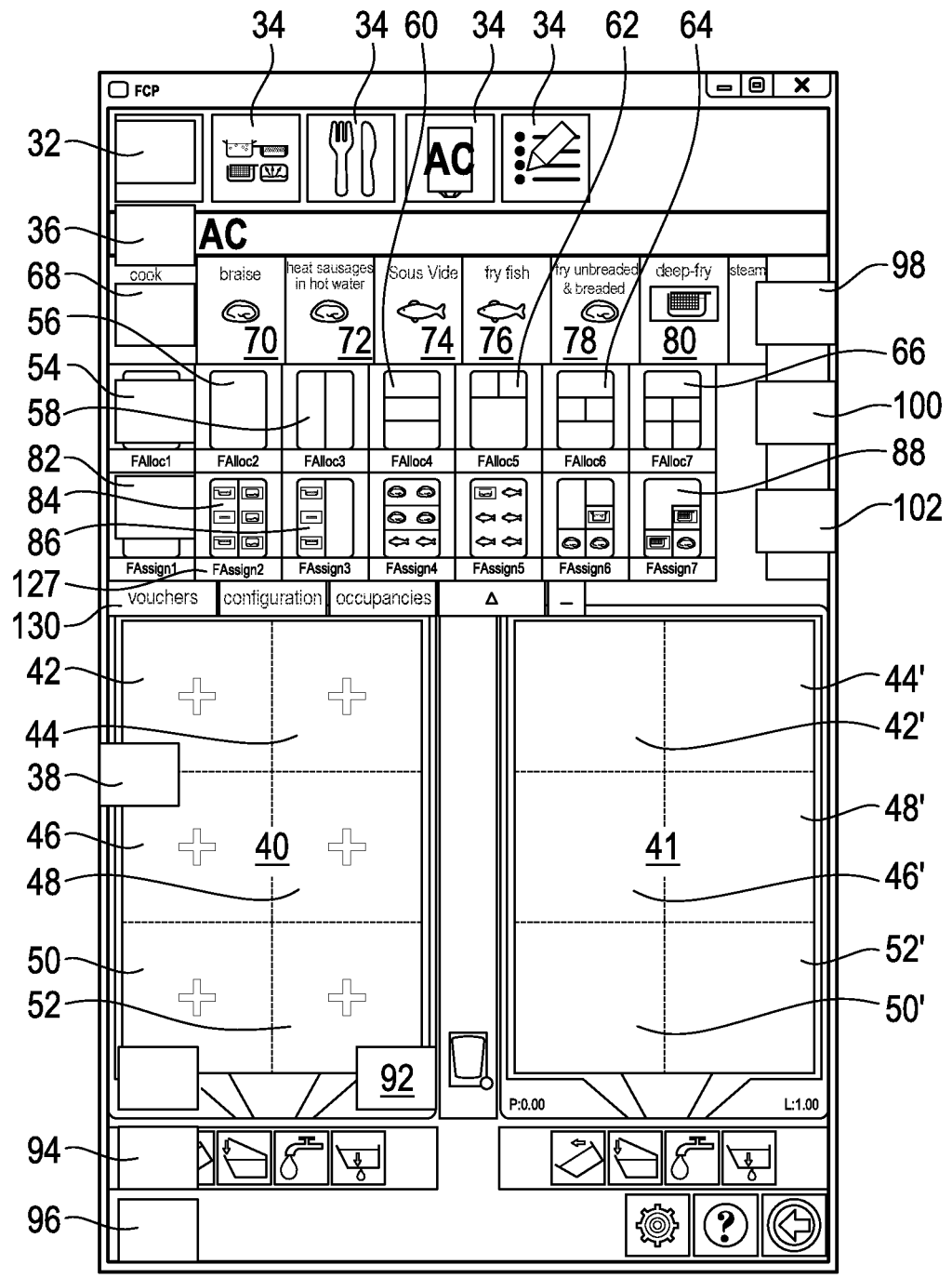
FIG. 2 shows an example of a first menu level that is displayed by means of the method according to the invention on the touchscreen according to a first state.

The controller 24 also controls the display brought about by the touchscreen 26, which is illustrated in FIG. 2 by way of a first menu level as an example.

The touchscreen 26 has a plurality of sections and overview fields that will be described below. A top line 32 comprises a plurality of virtual keys 34 marked with symbols and by means of which the operating mode is selected by touching when selecting the corresponding key.

The present operating mode is the "AC" mode; below the line 32, the touchscreen already shows the corresponding keys and displays of the AC operating mode in FIG. 2. In the line 36 below, the currently selected operating mode from line 32 can be reproduced again in letters or in a symbol. Thus, the current operating mode is apparent from the line 36, and parallel to this, a different operating mode can be immediately selected using the line 32.

Before the three lines immediately below are dealt with, a so-called first overview field 38 will be discussed beforehand, in which the cooking chambers 40, 41 are symbolically represented in the form of the left and right pans 16. The cooking chambers 40, 41 are defined by the flat heating surfaces, i.e. here specifically the bottoms of the pans, on which food to be cooked can be placed or poured.

The pans 16 comprise, for example, on their bottoms six tile-like heating fields, which are arranged in two columns and three rows and are separately controllable and which are represented in FIG. 2 by corresponding areas 42 to 52 for the left pan and 42' to 52' for the right pan. These areas 42 to 52 and 42' to 52' are also separately selectable virtual keys that are selected when touched, as will be discussed further below.

If one of the two cooking chambers is to be occupied or, more generally, selected or edited, this cooking chamber is simply pressed in the first overview field 38 so that it is selected and focused. The particular cooking chamber is then automatically zoomed in larger so that, on the one hand, the overview for this cooking chamber is better and, on the other hand, it is clear that this cooking chamber has been selected. The cooking chamber not selected is then displayed smaller in the first overview field 38, although the corresponding information for its areas is preferably still displayed despite the smaller display. In order to make more space available for the cooking chamber shown enlarged, some of the second to fourth overview fields mentioned below may either not be displayed, or these fields may be reduced in size. If the focus is to be placed on the other cooking chamber, there are various possibilities. For a start, the cooking chamber previously displayed smaller may be tapped, and this pan becomes larger, while the other cooking chamber automatically becomes smaller. In addition, the previously mentioned rotary control 30 may also be actuated, which can be used to "switch" between the cooking chambers, i.e. to place the focus on one or the other cooking chamber. An optional arrow, the so-called "back arrow", or a wipe function may be used to optionally also retrieve the representation according to FIG. 2, in which both cooking chambers are shown having the same size. It is further conceivable that after a predefined time, after a cooking chamber has been placed in focus and no processing or editing of this cooking chamber has taken place, there will be a jump back again to the display as shown in FIG. 2.

A second overview field 54 is formed by a line in which a plurality of different, predefined cooking chamber subdivisions are displayed next to each other or one below the other symbolically by respectively separate, directly selectable virtual keys, also referred to as select keys. For example, the left-hand cooking chamber subdivision 56 and the corresponding key provide that all areas 42 to 52 are selected and the entire cooking chamber is selected here as the cooking chamber subdivision. The cooking chamber subdivision 58 adjoining on the right and the corresponding key provide that the cooking chamber is subdivided into a left and a right half here. The cooking chamber subdivision 60 adjoining on the right again with the corresponding key provides for a cooking chamber subdivision into three lines by synchronizing the areas 42 and 44, below them synchronizing the areas 46 and 48 and below them in turn the areas 50 and 52. The three further cooking chamber subdivisions 62 to 66 adjoining on the left have different special cooking chamber subdivisions, in which individual areas 42 to 52 or 42' to 52' are either individually connected or interconnected in groups. When areas are visually highlighted identically, for example are highlighted with the same color, are surrounded by the same frame or are displayed with the same brightness, this means that these areas are interconnected and are controlled identically in terms of temperature and regarding the course of the cooking process.

A third line, which represents a third overview field 68, has various virtual keys that list different cooking applications 70 to 80 that can be directly selected by touching the virtual key.

For example, the cooking application 70 is provided for braising, the cooking application 72 for heating sausages in hot water, the cooking application 74 for Sous Vide, the cooking application 76 for frying fish, the cooking application 78 for roasting unbreaded & breaded and the cooking application 80 for deep-frying.

A separate line, which forms a fourth overview field 82, has various virtual select keys 84 arranged next to each other, of which the four select keys 84 to 88 will be discussed below only by way of example. For these select keys 84 to 88, cooking chamber subdivisions have been performed, with the corresponding areas 42 to 52 or 42' to 52' already having cooking applications fixedly allocated to them. Here, too, an appropriate cooking chamber subdivision with a predefined cooking application may be directly selected immediately in the first menu level by touching the corresponding keys 84 to 88.

For example, the select key 84 provides that the previously or subsequently selected cooking chamber is divided into two halves so that the areas 42, 46 and 50 or 42', 46' and 50' are connected together, as is the right half, i.e. the areas 44, 48, 52 or 44', 48', 52'. The areas 42, 46, 50 or 42', 46', 50' have a braising firmly allocated to them, whereas the areas 44, 48, 52 or 44', 48', 52' have a fry fish cooking application allocated to them.

In the select key for the cooking chamber subdivision 58, each right half is inactive, i.e. the areas 44, 48, 52 or 44', 48', 52' are not selected, whereas in the left half, i.e. in the areas 42, 46, 50 or 42', 46', 50', the braising cooking application is allocated.

Behind the select key 88, for example, there is the deep-fry cooking application for the area 48 or 48' and the fry unbreaded & breaded cooking application for the area 52 or 52', and the cook cooking application for the area 50 or 50'.

If, for example, the cooking appliance is the cooking appliance with pans 16 shown in FIG. 1, a separation device having one or more walls may be introduced into the pan to realize different cooking applications, as is known from the prior art. These walls then separate, for example, the area 48' or 48' for deep-frying from the adjacent areas in a liquid-tight manner, so that a section is divided off from the pan, into which oil can be poured. The same applies to areas that are to be partitioned off for cooking. Alternatively, a so-called roasting separation may also be inserted, which prevents oil from flowing further into an adjacent part.

The allocation of a cooking application to an area in one of the two cooking chambers, i.e. pans 16, is effected, for example, by first tapping on an area of a pan, i.e. on the area 42 or 44, so that this area turns, for example, bright and the other area for the other cooking chamber turns dark or grayish. Then, the desired select key for the cooking applications 70 to 80 is tapped on to allocate them to the cooking chamber accordingly. Of course, the allocation may also be effected in reverse order, i.e. first tapping on the select key for the cooking applications 70 to 80 and then tapping on the cooking chamber. A further allocation may be made by a function of dragging and dropping between the options in the first and third overview fields 38 and 68, respectively.

The key 92 is a save key which may be used to save or store the current configuration of the cooking chamber or chambers after appropriate programming of areas. This configuration can also be used to be included as a new virtual key into the second, third or fourth overview field 54, 68 or 82, for example.

In line 94, a plurality of virtual action keys are arranged next to each other, which can be used to control or activate the water inlet, the movement of the cooking chamber or of the lid.

In line 96, symbols may be used to select appropriate select keys, e.g. a quick help function.

Virtual keys 98 to 102 are assigned to the overview fields 68, 54 and 82, respectively. When they are pressed, a submenu will open which can be used to program further options and thus select keys for the corresponding overview field or to provide previous options and select keys with different parameters, e.g. Diffident cooking temperatures.

An option for controlling the cooking appliance by means of the touchscreen will be explained below. For example, the operator wishes to fry several fish in the left pan. To this end, he/she touches the virtual cooking chamber 40, so that it is placed in the active focus, i.e. is selected. The display of the cooking chamber 40 becomes larger and that of the cooking chamber 41 smaller. Now he/she can configure or assign the cooking chamber 40. Then the operator can do the same with the cooking chamber 41.

The number of fish is so large that the operator has to activate the areas 50 and 52 of the virtual cooking chamber 40 therefor. To do this, he/she touches the areas 50, 52 in the first overview field, thus activating them, so that they appear brighter than the other areas, for example. Then, he/she touches the select key for the cooking application 76. This already effects the allocation. Alternatively, the "fry fish" cooking application 76 may first be pressed for selection, and then this cooking application is allocated to the areas 50, 52 by tapping these areas.

Alternatively, one or more areas 42 to 52' may be selected first, and then a virtual key 34 is touched, which causes a pull-down menu to open, which will line up all cooking applications. This virtual key 34 is employed in particular when the third overview field 68 is faded out.

A further option consists in first selecting the cooking application 76 by touching the select key accordingly, and then dragging and dropping this cooking application to the areas 50 and 52.

For this selection process, the operator does not have to dive into a submenu; operation at the first menu level is sufficient.

A different example will be discussed below by using the second overview field 54. First, either the cooking chamber 40 or the cooking chamber 41 is selected by touch so that it comes into focus. The operator then presses the select key in the second overview field 54 for the cooking chamber subdivision 58 so that the cooking chamber 40 is divided into two halves. Now he/she presses the cooking application 70 for "braising" for the left half and the cooking application 72 for "heating sausages in hot water" for the right half. The corresponding fixing of the allocation may also be done by tapping, double tapping or drag-and-drop, if necessary with the aid of the rotary control 30 or a fixing key. The fixing key is, for example, a small virtual key in each area 42 to 52', which is provided with a tick symbol, for example. Fixing can also be effected in that no further entry is made after a given time, so that the appliance automatically proceeds from a desired allocation and then fixes it. In this example, too, the order in which the keys are pressed first is not fixed.

To make it more difficult to operate the appliance incorrectly after it has already been operated, the remaining options that have not been selected may be faded out after selecting an option from the second, third or fourth overview fields 54, 68 or 82. If, for example, the cooking application 70 is selected from the third overview field 68, the other cooking applications 72 to 80 are faded out or collapsed for safety reasons so that the operator does not inadvertently touch one of these keys and changes the cooking application. The same applies to the other overview fields 54 and 82.

Alternatively, in the first menu level not all of the overview fields 54, 68 and 82 are shown, as illustrated in FIG. 2, but only two or even only one of the overview fields 54, 68, 82. To enable the user to jump to another overview field as quickly as possible, a field 130 is permanently available, in which one of the overview fields 54, 68 and 82 can be selected and thus displayed. This field contains so-called retrieval keys, one retrieval key each for the second, third and fourth overview fields 54, 68, 82. The virtual key "vouchers" stands for cooking applications and thus for displaying the third overview field 68; the virtual key "configuration" stands for cooking chamber subdivision and thus for displaying the second overview field 54; and the virtual key "occupancy" stands for cooking chamber subdivisions with allocated cooking applications and thus for displaying the fourth overview field 82.

A further way of reducing the information displayed is to store the use of the operating menu in the controller 24, if necessary on a user-specific basis. That is, the controller 24 remembers which overview fields the respective operator prefers to use, and fades out e.g. the most rarely used overview field 54, 68 or 82 from the first menu level, or it fades in only the last used overview field 54, 68 or 82 and fades out the others for the time being; however, these can appear immediately again in the first menu level by pressing the appropriate key.

Optionally, there are still further possibilities to make the illustrated method of displaying the operating menu and of controlling the appliance user-friendly. These will be discussed below; they may be implemented in combination or separately.

If the operator wishes to place a cooking application on an already occupied area 42 to 52', i.e. a cooking application is currently in progress in this area, a notice will appear on the touchscreen and the running cooking application may be aborted or canceled and replaced by the new one. This may, for example, be done after a particular, required actuation or after a predefined time during which no abort or break-off is initiated.

The cooking application itself can start at once, for example, when an area 42 to 52' has a cooking application 70 to 80 allocated to it, either after a lapse of time or after an additional actuation of an appropriate virtual key or another click on the select field or the area.

For example, if the operator selects a cooking application that requires an area to be divided off, such as deep-frying, after selecting the cooking application 80 "deep-fry", the operator will be prompted by a suitable notice on the touchscreen to insert a cooking chamber partition. This is done for liquid cooking media or also for liquid goods to be cooked (e.g. soups).

A selected area to which a cooking application has already been allocated may be extended, for example, by a subsequent tapping or wiping from the occupied area to the additionally added area. For example, if braising is carried out in the area 42, after allocating "braise" to the area 42, the area 44 may be tapped, or the operator wipes his/her finger from the area 42 to the area 44, and the "braise" cooking application will be extended to the area 44 accordingly. This extension may possibly be done by fixing (double-tapping, pressing a different defined key such as the previously mentioned fixing key or pressing the rotary control 30) or else by lapse of time after the latest actuation if no further actuation takes place within a time window.

Further select options for areas 42 to 52' which are to be activated or to which certain cooking applications are to be allocated are, for example:

a) tapping a plurality of areas 42 to 52' simultaneously with multiple fingers (multitouch);

b) individually touching an area 42 to 52' and drawing up a corresponding rectangle by contacting a corner, with the drawing-up process then simultaneously activating the traversed regions;

c) touching an area 42 to 52' and then turning the rotary control 30 to extend the marked areas row by row and column by column;

d) drawing a frame around the areas 42 to 52' using a finger in order to mark and select them;

e) tapping two points that symbolize the diagonal of a rectangle, the areas 42 to 52' located or partially located within the rectangle then being selected; and/or f) identifying a row or column and dragging the surface down or shifting it sideways to mark adjacent surfaces and thus areas.

A further option for increasing clarity consists in that if there is a plurality of cooking chambers, they are permanently displayed symbolically next to each other, and even if one of the cooking chambers is illustrated larger, it is displayed in the other cooking chambers illustrated smaller on the touchscreen which occupancy and/or cooking processes are currently in progress there. Alternatively or additionally, messages can also be displayed for this cooking chamber illustrated smaller, for example about the remaining cooking time.

A further simplification in the operation and controlling of the cooking appliance in combination with an improved method of displaying the operating menu results in that after cooking areas 42 to 52' and cooking applications 70 to 80 have been allocated, it is displayed in the first overview field 38, for example by corresponding areas lighting up or arrows fading in, to which further areas 42 to 52' the selected cooking application can be extended. These further areas may then be linked to the just selected cooking application by selection, e.g. by tapping or wiping. This prevents areas 42 to 52' from being linked to cooking applications that would lead to non-optimal cooking results due to cooking applications in a neighboring area being too different. Such a recommended expansion of the areas for a particular cooking application can also be further staggered, e.g. by indicating the suitability in several stages, e.g. well suited, of limited suitability, or unsuitable. Here, for example, well suited areas may be highlighted in green, areas of limited suitability in yellow and unsuitable areas in red. Optionally, unsuitable areas cannot be selected at all, they are blocked by the controller.

Furthermore, in the case of a plurality of cooking chambers, when a cooking chamber subdivision is selected, the controller 24 may display which of the cooking chambers is particularly well suited for the desired cooking chamber subdivision, for example because other areas with similar cooking applications are already charged here or these areas are free or a suitable residual heat prevails in certain areas.

If there are several suggestions, they can be called up separately, e.g. by turning the rotary control 30 or by wiping. An appropriate selection can then be made by using the touchscreen or, for example, by pressing the rotary control 30.

Conversely, the controller 24 may also make suggestions, prior to the allocation of cooking applications to areas, as to which areas can be optimally allocated, that is, which areas are suitable. If the cooking application 70 to 80 is selected first, the controller then displays on the touchscreen those areas 42 to 52' in which the selected cooking application is carried out best. The unsuitable areas or less suitable areas are then accordingly not displayed at all, displayed as being of limited suitability or displayed as being well suitable.

The following basic parameters may be included in the calculation in the controller 24 separately or in any desired combination in order to select the areas 42 to 52' which are well suited or of limited suitability for a cooking application:

a) position and number of the water inlets for filling in water as the cooking medium;

b) position of the so-called pouring spout for tipping out the cooked food;

c) position and number of the core temperature sensors for measuring the temperature of the food being cooked;

d) necessity, availability, shape, and current or possible position of a cooking chamber separation for cooking applications with a liquid cooking medium or liquid food to be cooked;

e) position of the so-called cooking chamber discharge valve for draining cooking medium;

f) position of the filling level measuring system for detecting the filled-in amount of liquid cooking medium or liquid food being cooked;

g) shape and/or size of cooking baskets which are inserted in one of the pans or in a separated area of the pan 16, e.g. for deep-frying;

h) the cooking applications themselves, that is, e.g., cooking, frying, braising, deep-frying, steaming, pressure cooking, etc.;

i) cooking media in which the cooking applications are carried out, e.g. oil, water, steam, etc.;

j) position of the lid (lid must remain closed during steaming and open during frying, for example);

k) locking of the lid, e.g. necessary during pressure cooking, not necessary during frying;

l) current temperature of the operating surface or of the cooking medium or desired temperature of the selected cooking application;

m) temperatures of the adjacent areas;

n) safety criteria, e.g. no cooking and deep-frying next to each other;

o) food to be cooked, e.g., no fish and meat next to each other for hygienic reasons, in order to prevent allergens from entering other areas and to avoid the transfer of taste or the color of the food to be cooked being affected;

p) ergonomics, since, e.g., cooking applications involving many mechanical actions such as turning should be carried out better in more easily accessible and therefore front areas 50 to 52';

q) energy saving potential, by positioning power-intensive cooking applications next to each other or by making use of the residual heat of the surface; and/or r) available power of the appliance or of the electric power grid, when a plurality of cooking chambers are connected next to each other or one above the other or a plurality of cooking appliances are intended to run in parallel in order not to excessively power up cooking chambers or cooking appliances, if, for example, another cooking chamber or another cooking appliance is currently at a high temperature suitable for cooking at the desired high temperature of new foods to be cooked.

The above-mentioned basic parameters may also be weighted differently, i.e. prioritized differently. The weighting may be predefined by the cooking appliance or set individually by the operator.

When determining which area is best suited for a cooking process planned by the user, the controller also accesses information that goes beyond the currently ongoing cooking processes.

For example, the controller may take into account which cooking processes are planned for the future. For example, if quite a large amount of soup has to be cooked soon, it may only "release" a cooking area as suitable if the new cooking process is completed in time.

The controller may also take into account external parameters such as, e.g., a maximum connected load of the cooking appliance or of a whole group of cooking appliances that are networked with the controller. For example, new areas for a particular cooking process may only be released as suitable if a specified connected load is not exceeded with a view to the currently planned other cooking processes.

Figure 3:
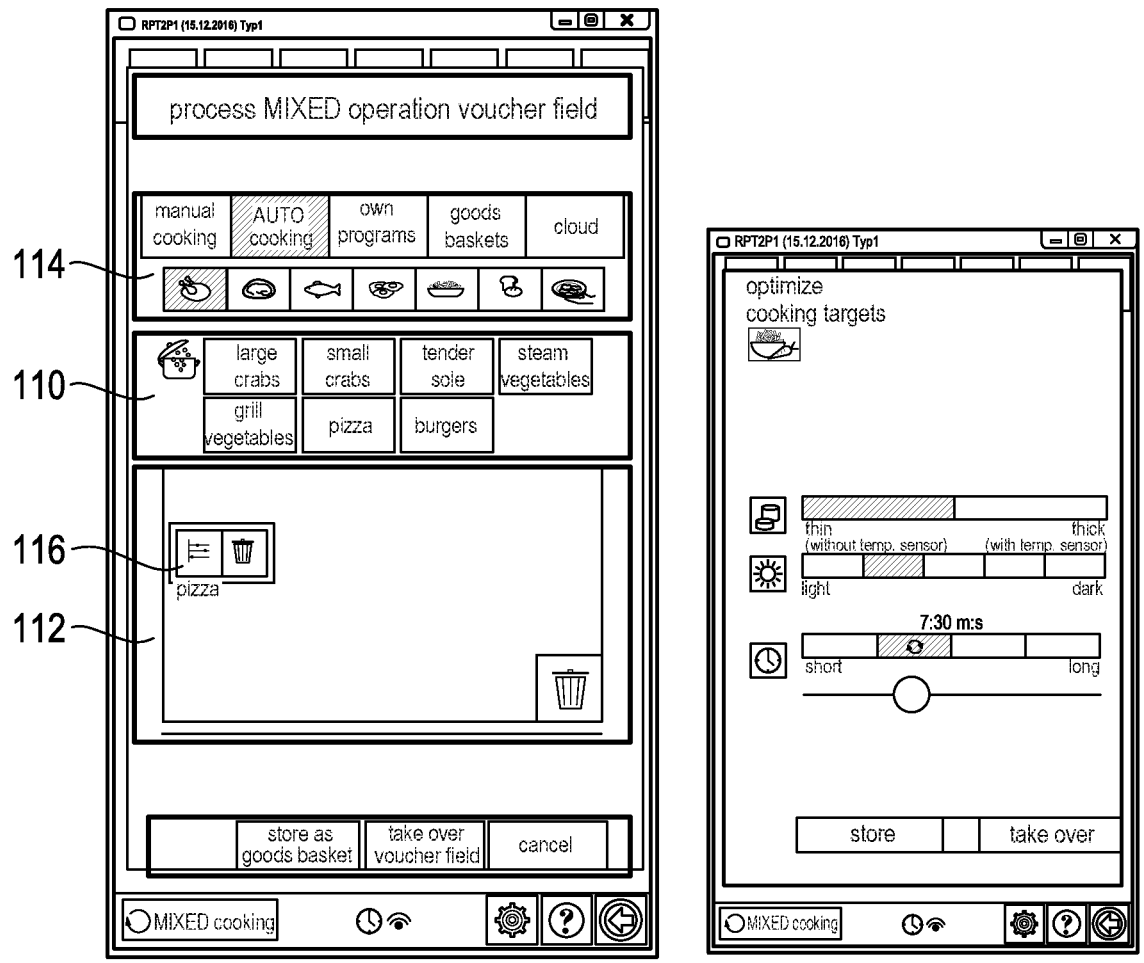
FIG. 3 shows a second and a third menu level depicted next to each other, for programming or setting cooking applications.
Figure 4:
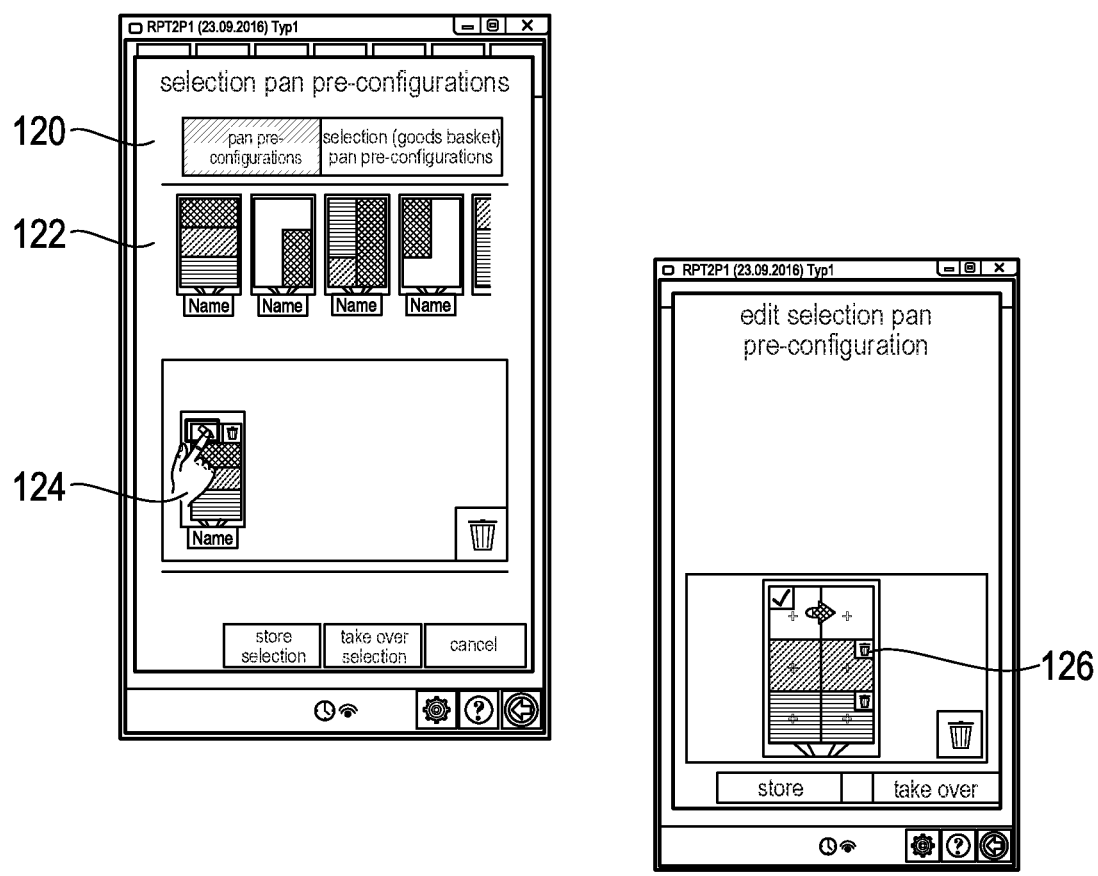
FIG. 4 shows a second and a third menu level depicted next to each other, for programming or setting cooking chamber subdivisions.
Figure 5:
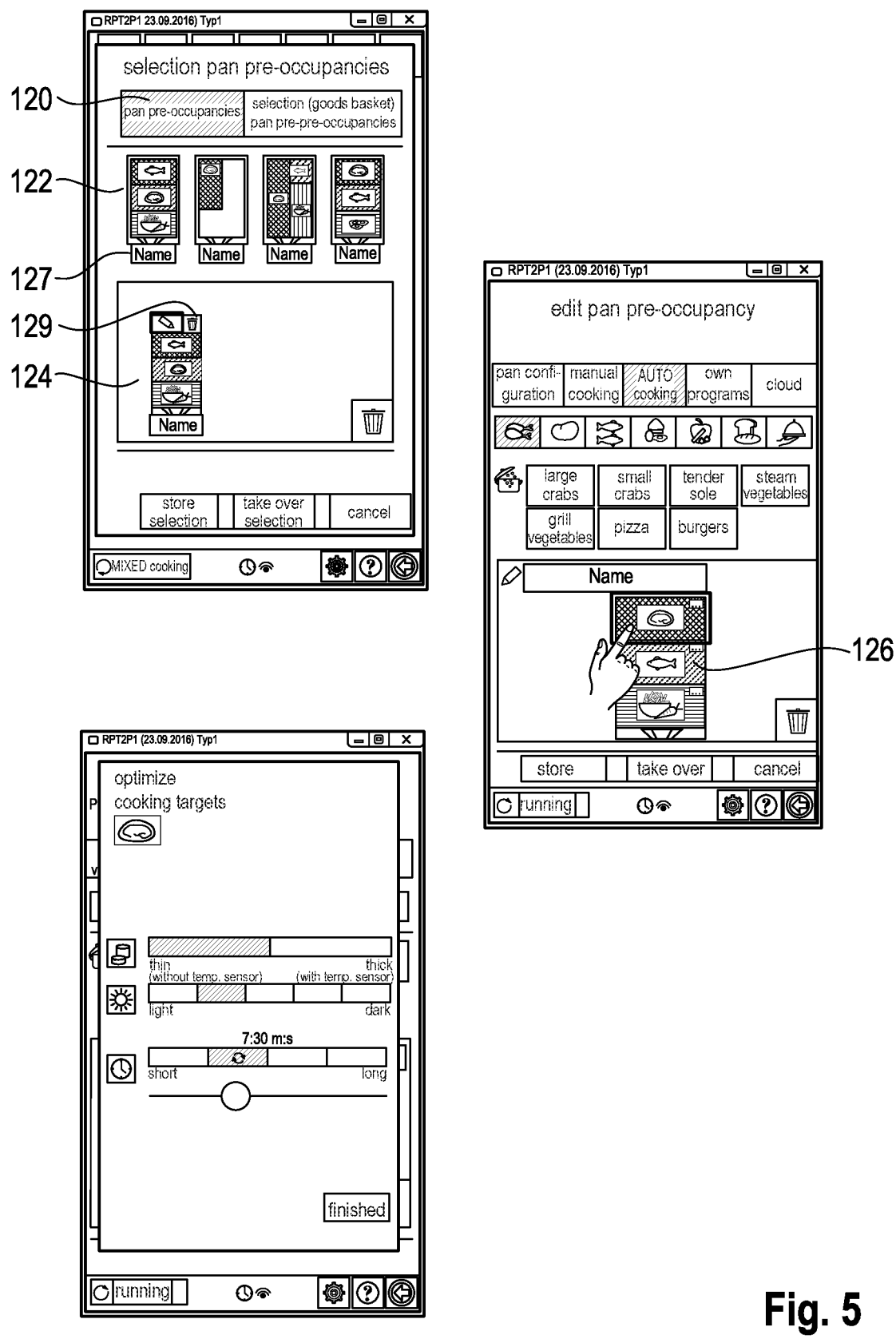
FIG. 5 shows a second and a third as well as a fourth menu level, depicted next to each other, for programming and setting cooking chamber subdivisions with pre-occupancy of cooking applications.

With reference to FIGS. 3 through 5, it will be discussed below how the display can be reprogrammed and the method of displaying the operating menu and the controlling of the appliance can be modified thereby.

FIG. 3 shows a submenu (left) and a further submenu (right), in which the cooking applications 70 to 80 can be modified and thus individualized and in which primarily those cooking applications 70 to 80 can be selected that are to be displayed in the third overview field. In the left-hand submenu, the order of the cooking applications 70 to 80 illustrated in the third overview field 68 can also be altered and set.

For example, to this end, the key 98 is pressed, which causes the left display and thus a submenu level to be opened. In this submenu, the operator may select from the field 114 whether the cooking application to be created should be carried out via "manual cooking", "AUTO cooking", "own programs", "goods baskets", or via the "cloud". In the example shown, a virtual key "pizza" is created for the third overview field 68. The operator therefore selects "AUTO cooking" in field 114 and then "pizza" in field 110, whereupon he/she receives a symbol 116 "pizza" in field 112. He/she can also do the same, for example, with a steak to be cooked manually or a special cooking application to be downloaded from the cloud. After the operator has compiled in field 112 all of his/her cooking applications desired by him/her, he/she can take them over into the third overview field 68 by pressing the "take over voucher field" key. Should the number of virtual keys be greater than the number of the cooking applications to be displayed and possible in the third overview field 68, for example, only the first six cooking applications are displayed, while the others can be viewed by scrolling using a wiping gesture.

But it is also possible to generate goods baskets in this first menu level, i.e. a collection of any number of applications. These applications may then again be called up from the goods basket as required. For example, the operator may create a "breakfast" goods basket that lists all cooking applications he/she needs to prepare breakfast in a hotel. Cooking applications may also be dragged from goods baskets to the third overview field 68 using the key in the field 114 or may be included in a goods basket using the "store as goods basket" key.

In the illustrated submenu, individual cooking applications may also be created or existing cooking applications modified using the "own programs" key. This is done by calling up the submenu illustrated on the right, in which the cooking targets can be set or optimized. Here, the operator may select, for example, whether the food to be cooked should be cooked to be rather light or dark, whether it is rather thick or thin, whether cooking is to be done with or without a temperature sensor, and the appropriate cooking time. But in the illustrated submenu, applications may also be individually parameterized using the key 116. The "take over" of the parameterization leads to a temporary inclusion of the application in field 112 or 68. The "storing" by pressing the corresponding key is effected to be permanent, i.e. the cooking applications remain in existence even if the cooking appliance is switched off or even completely disconnected from the power supply.

The select keys that are generated are automatically and independently displayed in the first menu level, at least those that are positioned first.

FIG. 4 illustrates which cooking chamber subdivisions are to be displayed at which position in the first overview field 54 or how cooking chamber subdivisions can be individualized, optimized and additional cooking chamber subdivisions can be generated.

Here, too, the submenu shown in FIG. 4 is called up by pressing the virtual key 100, for example. In field 120 it can be selected whether the operator wishes to select from pre-configurations already saved in the appliance or from pre-configurations stored in the goods basket. In the example shown, he/she has selected the virtual key "pan pre-configurations", whereupon all saved preconfigured cooking chamber subdivisions are displayed to him/her in field 122. Scrolling further to the left or right is also possible here. The user has then selected the left symbol for a pre-configuration and has dragged it into field 124 using drag and drop, for example. With respect to the operation, this is done in exactly the same way as for the cooking applications in the submenu according to FIG. 3.

However, the operator may also create an individual pan configuration, similar to the right submenu in FIG. 3, by selecting a pre-configuration and then editing it, which is done in the submenu shown on the right. Here he/she can delete, confirm or change the configuration of areas 42 to 52'. The "take over" of the parameterization leads to a temporary inclusion of the application into field 124 or 54.

By selecting and pressing the "save" keys, cooking chamber divisions can be saved permanently, i.e. the cooking applications remain in existence even if the cooking appliance is switched off or even completely disconnected from the power supply.

After field 124 has been completed, the selection can be taken over, after which the cooking chamber subdivisions are displayed in the second overview field 54 in the order in which they were positioned in field 124.

The controller 24 is designed such that it outputs a visual indication in the case of identical cooking chamber subdivisions which, however, have different allocated cooking applications, so that the symbols for cooking chamber subdivisions do not appear identical. For example, an index may also be generated independently.

As can be seen in FIG. 2, each select key 84 to 88 has a name field 127, as does each cooking application and each cooking chamber subdivision. This name field 127 may be repositioned, edited and/or labelled via the touchscreen during saving. If the controller generates an index, this index is entered into the name field 127.

The illustrated method and the illustrated cooking appliance and its controller 24 also allow factory-provided pre-configured cooking chamber subdivisions 56 to 66, cooking applications 70 to 80 and/or cooking chamber subdivisions with allocated cooking applications, here the select keys 84 to 88, to be permanently deleted. This delete process goes beyond the ON time of the cooking appliance and also beyond a disconnection from the power grid.

All of the above-mentioned methods of generating new select keys in the overview fields 54, 68 and 82 may also be carried out while cooking is ongoing, in order to save time.

Similar to FIGS. 3 and 4 above, new virtual select keys for the fourth overview field 82 can also be selected, positioned, or existing select keys 84 to 88 can be changed and temporarily or permanently saved again. This is shown in FIG. 5.

The first submenu (top left) is structured identically to the one shown in FIG. 4; here, only the corresponding select keys are characterized in that they show a combination of cooking chamber subdivisions and allocated cooking applications. Since the functionality and subdivision of this submenu corresponds to that of FIG. 4, the reference numbers already introduced are retained for the same and functionally identical fields and areas. The operator can therefore first select in field 120 whether he/she wants to select the pan pre-occupancies in the appliance or from the goods basket, which are then displayed accordingly in field 122 and can be shifted from field 122 into field 124 by dragging and dropping and positioned there and fixed in the desired sequence.

A virtual key dragged into field 124 has at the top edge a small pop-over key 129, which may be used to open the right submenu and not only to call up and change cooking parameters, but also to delete them. Furthermore, the virtual key may be selected for easier editing, whereupon a further operating level opens.

In the right-hand submenu the virtual key with all pre-occupancies can then be edited, and by calling up a further submenu, which is shown at the bottom left, it is also possible to set or change the cooking targets such as the cooking targets discussed above with reference to FIG. 3.

Cooking applications, cooking chamber subdivisions and/or select keys with a cooking application along with a subdivision that were stored already in the factory can be permanently deleted by the operator (possibly only for him/her) or shifted to a submenu level.

Generally, however, these cooking chamber subdivisions with pre-assignment of cooking applications may also be created manually from cooking chamber subdivisions, manual operating modes, cooking paths, own programs and applications from the cloud. A new select key may, for example, be created by selecting areas in the first menu level, then allocating cooking applications and storing them permanently or storing them temporarily for take-over. Here, too, new or changed cooking chamber subdivisions with allocated cooking applications may be taken over directly into the third overview field 82 as new select keys after saving.

After generating new select keys for the overview fields 54, 68, 82, they may be saved permanently to the effect that they remain saved beyond the cooking process, the ON time of the cooking appliance and its disconnection from the electric power grid.

The representation and subdivision of the cooking chambers into areas 42 to 52' may be based on the heating units, the positions of the water inlet, the positions of the cooking chamber separations and/or the positions of the cooking chamber drain and/or the accessories.

In addition, information on at least the most important parameters (e.g., remaining cooking time and/or cooking temperature) can either be faded in immediately in each individual area 42 to 52 after activation thereof (see FIG. 7), or this information will appear immediately in a submenu by tapping the area. But the information may also appear at some other suitable position of the display, or the display may be switched over.

Figure 6:
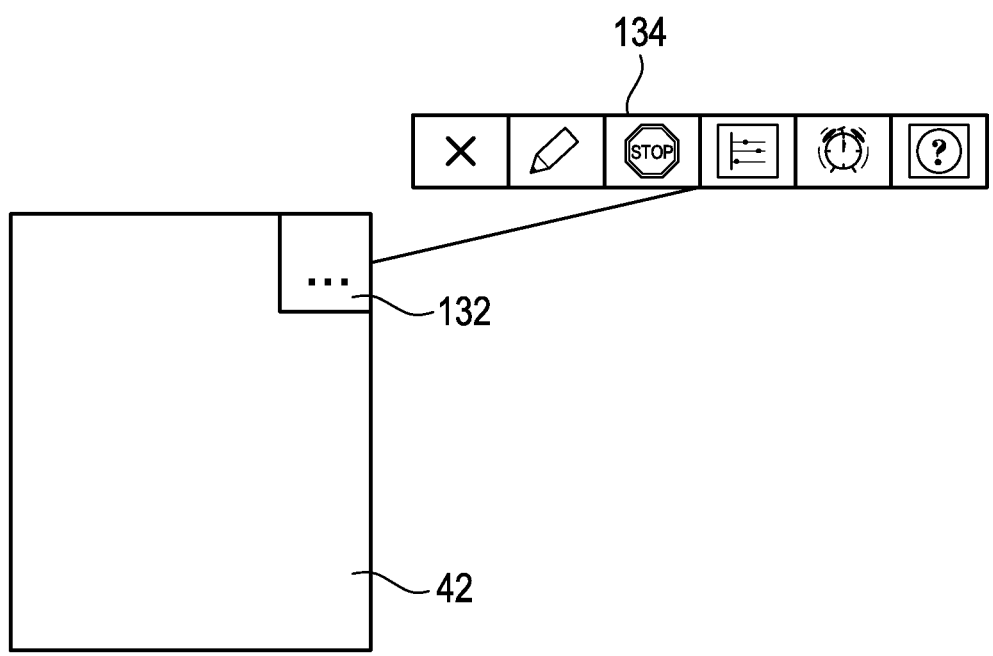
FIG. 6 shows an enlarged illustration of an area of a cooking chamber with a pop-up key.

A further or additional option for quick accessibility of the cooking applications in the areas 42 to 52' is illustrated in FIG. 6. Here, the area 42 is shown by way of example, which has a virtual key, a so-called pop-over key 132, at its upper right end. By selecting this key 132, a pop-over menu 134 is displayed, in which the following virtual keys can be faded in: stop key, timer key, delete key, key for changing the areas 42 to 52', and modifier key for opening a submenu, and possibly help key. But it is also possible to press the area 42 directly, which opens a menu in which, for example, the cooking parameters can be set or only displayed. A different option is that pressing the key 42 opens the pop-over menu 134, or that upon pressing the key 42, a function is called up directly which is one of the functions directly stored in the pop-over menu 134.

Figure 7:
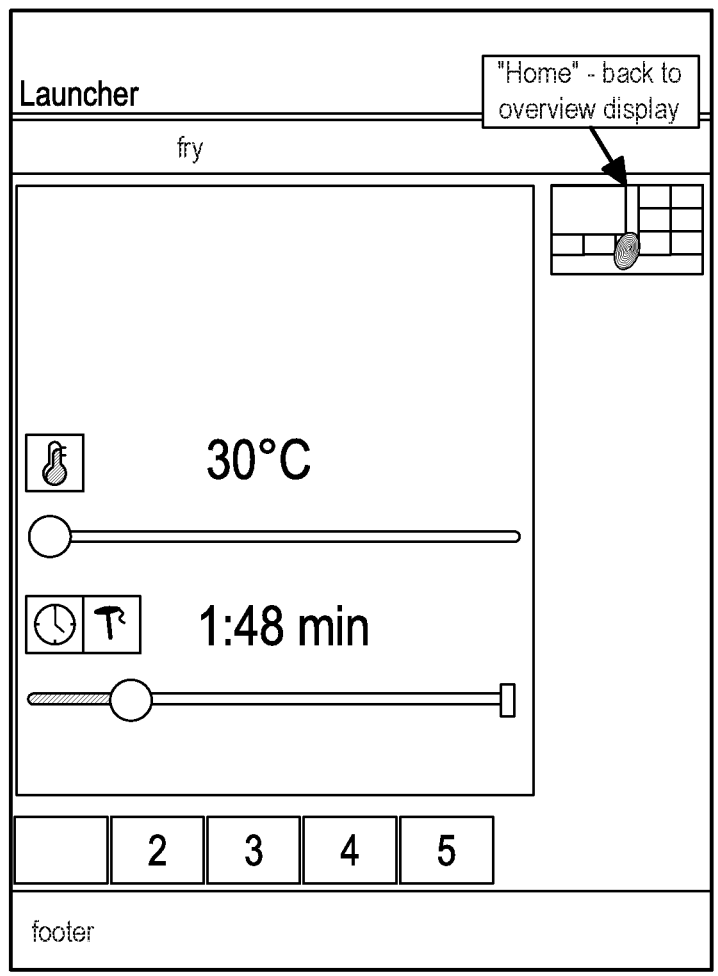
FIG. 7 shows a view of the touchscreen after selecting a cooking chamber area with cooking parameter view.

Finally, FIG. 7 shows how the cooking parameters can be changed quickly. An occupied cooking chamber area 42 to 52', for example, is called up as mentioned above, so that the submenu opens as shown in FIG. 7. All important parameters are then illustrated already in this submenu and can also be changed immediately. Alternatively, these parameters can also be selected using the pop-up menu shown in FIG. 6 and can be changed accordingly.

A second embodiment of the method according to the invention provides that in the first menu level the first overview field 54 is not present. Either the third overview field 68 or the fourth overview field 82 is provided, so that instead of three overview fields 54, 68 and 82, only the overview field 68 or 82 is present. In this way, more space is created for the first overview field 38. If desired, it is possible to jump between the overview fields 68 and 82.

As far as the present method is concerned, it should be emphasized that, in the preferred embodiments, in the first menu level there is always the possibility, i.e. even during the cooking processes, to change areas or to change cooking parameters. In some cases, it is not even necessary to go to a submenu for this, rather, the changes can take place in the first menu level, e.g. by allocating a different cooking application to an area or by providing a further area with a cooking application. By calling up only one submenu (see FIG. 6 or 7, for example), cooking parameters can be changed completely or a cooking application may be deleted. The operating depth is extremely low, which makes the implementation of the method very transparent and flexible.

But the user himself/herself still has all the select options, but is supported at the same time by means of suggestions for the extension of cooking areas for cooking applications.

As already discussed earlier, the operator can configure not only one cooking chamber, but all cooking chambers of the cooking appliance.

The cooking chamber subdivision does not have to be limited to heating fields, but, if required, it may also be possible to select areas 42 to 52' in the first overview field 38 which are located outside the limits of neighboring heating fields, i.e. for example, to select the areas 42 and the left half of the area 44.

The invention claimed is:

1. A method of displaying at least one operating menu of a cooking appliance on a touchscreen and of controlling the cooking appliance, the operating menu having different menu levels, characterized in that in a first menu level, displaying:
   a) a first overview field of at least one cooking chamber defined by a flat heating surface that serves to heat the cooking chamber, wherein the flat heating surface comprises a plurality of directly selectable areas that are defined by a plurality of heating elements and each of the plurality of areas is heated separately and independently from adjacent areas, and wherein said directly selectable areas have corresponding activation areas in the first menu level for separate activation of the areas of the flat heating surface;
   b) a second overview field having and showing a plurality of different predefined cooking chamber subdivisions, each shown subdivision comprising one or more of the directly selectable areas for separate activation of the flat heating surface, without already allocated cooking applications linked to each of the separately activatable areas of the subdivision of the cooking chamber, the predefined cooking chamber subdivisions being directly selectable in the first menu level for activation of the corresponding flat heating surface areas;
   c) a third overview field having a plurality of different cooking applications, which are directly selectable in the first menu level for activation; and
   d) a fourth overview field having and showing different, predefined cooking chamber subdivisions, with already allocated cooking applications, each shown subdivision comprising one or more of the directly selectable areas for separate activation of the flat heating surface, wherein the one or more directly selectable areas of the flat heating surface define a shape and area of the corresponding chamber subdivision, wherein the different predefined cooking chamber subdivisions include different separately activatable areas of the heating surface with already allocated cooking applications, which are directly selectable in the first menu level;

wherein in the first menu level, in addition to displaying the first overview field, only one of the second, third and fourth overview fields is displayed, and a selection can be made by means of additional virtual keys as to whether the one of the second, third and fourth overview fields is the additionally displayed overview field; and wherein both said predefined cooking chamber subdivisions without already allocated cooking applications and said predefined cooking chamber subdivisions with already allocated cooking applications include user-defined cooking chamber subdivisions generated by a user using the touchscreen, displayed on the touchscreen, and saved beyond an ON time of the cooking appliance.

2. The method according to claim 1, wherein in the first menu level, the third overview field is also displayed, and areas of the cooking chamber can be selected and cooking applications can be allocated to the selected areas without leaving the first menu level.

3. The method according to claim 1, wherein after selecting an option in the at least one of the second, third and fourth overview fields, the remaining options of these overview fields are faded out.

4. The method according to claim 1, wherein the use of the operating menu is saved in a controller and, in a subsequent operation, either at least the overview field from the group of the second, third and fourth overview fields that is most rarely used is faded out from the first menu level, or the overview field that was last used is faded in and the remaining overview fields are faded out.

5. The method according to claim 1, wherein cooking applications are allocated to selected areas of the cooking chamber or, conversely, selected areas of the cooking chamber are allocated to cooking applications, by selecting the areas in the first overview field and cooking applications in the third overview field.

6. The method according to claim 5, wherein after allocation of areas and cooking applications, the first overview field displays to which further areas the selected cooking application can be extended.

7. The method according to claim 1, wherein after a selection of a cooking application, the first overview field displays at least one area which is allocated in an optimized manner by an allocated controller and which can be selected in order to place the selected cooking application in said area or to extend it to said area.

8. The method according to claim 1, wherein from the first menu level a submenu can be called, in which cooking applications can be individualized or in which the predefined cooking chamber subdivisions, predefined cooking applications and predefined cooking chamber subdivisions with already allocated cooking applications, to be displayed in the first menu level in the second to fourth overview fields, respectively, can be selected and/or positioned.

9. The method according to claim 1, wherein additional, individually parameterizable select keys can be generated and saved permanently in a submenu for at least one of the second, third and fourth overview fields.

10. The method according to claim 1, wherein in the first menu level and in the first overview field, either a plurality of cooking chambers having cooking chamber areas that are selectable in the first menu level and activatable thereby are displayed next to each other, or cooking chambers can be selected individually in order to be displayed alone.

11. The method according to claim 1, wherein an information display area is available in the first menu level or can be faded into the first menu level by selection, wherein the information display area contains information in relation to parameters for each area of the cooking chamber.

12. The method according to claim 1, wherein each area in the first overview field is selectable such that access to at least one of the following keys is effected, which are faded in: stop key, timer key, delete key, key for opening a function to change the selected areas, and modifier key for opening a submenu.

13. A cooking appliance, comprising:
at least one cooking chamber defined by a flat heating surface that serves to heat the cooking chamber, wherein the flat heating surface comprises a plurality of directly selectable areas that are defined by a plurality of heating elements and each of the plurality of areas is heated separately and independently from adjacent areas;
at least one computer processor coupled to a touchscreen, the touchscreen displaying at least one operating menu, the operating menu having different menu levels, wherein a first menu level displays:
a first overview field of the at least one cooking chamber, wherein said directly selectable areas of the cooking chamber have corresponding activation areas in the first menu level for separate activation of the areas of the flat heating surface;
a second overview field having and showing a plurality of different predefined cooking chamber subdivisions, each shown subdivision comprising one or more of the directly selectable areas for separate activation of the flat heating surface, without already allocated cooking applications linked to each of the separately activatable areas of the subdivision of the cooking chamber, the predefined cooking chamber subdivisions being directly selectable in the first menu level for activation of the corresponding flat heating surface areas;
a third overview field having a plurality of different cooking applications, which are directly selectable in the first menu level for activation; and
a fourth overview field having and showing different, predefined cooking chamber subdivisions, with already allocated cooking applications, each shown subdivision comprising one or more of the directly selectable areas for separate activation of the flat heating surface, wherein the one or more directly selectable areas of the flat heating surface define a shape and area of the corresponding chamber subdivision, wherein the different predefined cooking chamber subdivisions include different separately activatable areas of the heating surface with already allocated cooking applications, which are directly selectable in the first menu level;
wherein in the first menu level, in addition to displaying the first overview field, only one of the second, third and fourth overview fields is displayed, and a selection can be made by means of additional virtual keys as to whether the one of the second, third and fourth overview fields is the additionally displayed overview field; and wherein both said predefined cooking chamber subdivisions without already allocated cooking applications and said predefined cooking chamber subdivisions with already allocated cooking applications include user-defined cooking chamber subdivisions generated by a user using the touchscreen, displayed on the touchscreen, and saved beyond an ON time of the cooking appliance.

14. The cooking appliance according to claim 13, wherein in the first menu level, the third overview field is also displayed, and areas of the cooking chamber can be selected and cooking applications can be allocated to the selected areas without leaving the first menu level.

15. The cooking appliance according to claim 13, wherein after selecting an option in the at least one of the second, third and fourth overview fields, the remaining options of these overview fields are faded out.

16. The cooking appliance according to claim 13, wherein the use of the operating menu is saved in a controller and, in a subsequent operation, either at least the overview field from the group of the second, third and fourth overview fields that is most rarely used is faded out from the first menu level, or the overview field that was last used is faded in and the remaining overview fields are faded out.

17. The cooking appliance according to claim 13, wherein cooking applications are allocated to selected areas of the cooking chamber or, conversely, selected areas of the cooking chamber are allocated to cooking applications, by selecting the areas in the first overview field and cooking applications in the third overview field.

18. The cooking appliance according to claim 13, wherein after a selection of a cooking application, the first overview field displays at least one area which is allocated in an optimized manner by an allocated controller and which can be selected in order to place the selected cooking application in said area or to extend it to said area.

19. The cooking appliance according to claim 13, wherein in the first menu level and in the first overview field, either a plurality of cooking chambers having cooking chamber areas that are selectable in the first menu level and activatable thereby are displayed next to each other, or cooking chambers can be selected individually in order to be displayed alone.

20. The cooking appliance according to claim 13, wherein an information display area is available in the first menu level or can be faded into the first menu level by selection, wherein the information display area contains information in relation to parameters for each area of the cooking chamber.

* * * * *